US012061051B2

(12) United States Patent
Sudhir Katikala et al.

(10) Patent No.: US 12,061,051 B2
(45) Date of Patent: Aug. 13, 2024

(54) SYSTEM AND METHOD FOR CAPTURING WASTE HEAT IN AN HVAC SYSTEM

(71) Applicant: Carrier Corporation, Palm Beach Gardens, FL (US)

(72) Inventors: Lok Sudhir Katikala, Telengana (IN); Srinivasa Reddy Pilli, Telengana (IN); Kanna Selvakani, Telengana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 217 days.

(21) Appl. No.: 17/249,199

(22) Filed: Feb. 23, 2021

(65) Prior Publication Data

US 2021/0278143 A1 Sep. 9, 2021

(30) Foreign Application Priority Data

Mar. 9, 2020 (IN) ............................ 202011010193

(51) Int. Cl.
*F28D 21/00* (2006.01)
*F27D 17/00* (2006.01)
*F27D 19/00* (2006.01)
*F27D 21/00* (2006.01)
*F28F 27/00* (2006.01)

(52) U.S. Cl.
CPC ......... *F28D 21/001* (2013.01); *F27D 17/004* (2013.01); *F27D 21/0014* (2013.01); *F28F 27/006* (2013.01); *F27D 2019/0031* (2013.01); *F28D 2021/0057* (2013.01)

(58) Field of Classification Search
CPC ...................................................... F28D 21/001
See application file for complete search history.

(56) References Cited

U.S. PATENT DOCUMENTS 5,427,086 A * 6/1995 Brownell .............. F24H 9/2085 126/116 A
6,006,741 A * 12/1999 Daddis, Jr. .............. F24H 3/087 165/177
6,335,572 B1 * 1/2002 Uno ....................... H10N 10/00 290/1 R
6,761,134 B1 * 7/2004 Trant .................... F24H 9/1836 122/504

(Continued)

FOREIGN PATENT DOCUMENTS

CA 2963266 A1 4/2016
EP 2856042 B1 5/2013
WO 2013025843 A1 2/2013

OTHER PUBLICATIONS

"Carbon Reducing Technology", TEC, retrieved on 2019, 2 Pages.
"Thermoelectric Generator TEG Modules", Analog Technologies, Jan. 2, 2014, 02 Pages.

*Primary Examiner* — David J Laux
(74) *Attorney, Agent, or Firm* — Souad Hakim

(57) ABSTRACT

A system and method of providing power to at least one component within a gas furnace, the method including operating a gas furnace to produce thermal energy; operating a waste heat assembly to extract the thermal energy from the gas furnace; operating the waste heat assembly to convert the extracted thermal energy to electrical energy; operating the waste heat assembly to transmit the electrical energy to at least one component of the gas furnace.

18 Claims, 4 Drawing Sheets

(56) References Cited

U.S. PATENT DOCUMENTS

| | | | | |
|---|---|---|---|---|
| 7,018,200 | B2 * | 3/2006 | Querejeta | F23N 5/102 431/77 |
| 7,317,265 | B2 | 1/2008 | Chian et al. | |
| 8,310,096 | B1 * | 11/2012 | Drahota | H02J 9/06 307/66 |
| 10,830,457 | B2 * | 11/2020 | Fard | F24D 12/02 |
| 2008/0092550 | A1 * | 4/2008 | Folsom | F24H 1/121 60/783 |
| 2008/0236561 | A1 * | 10/2008 | Kaiser | F24H 1/0027 126/116 C |
| 2012/0111386 | A1 | 5/2012 | Bell | |
| 2013/0098418 | A1 | 4/2013 | Polcyn | |
| 2013/0205780 | A1 | 8/2013 | Imran et al. | |
| 2013/0269743 | A1 * | 10/2013 | Tajima | H10N 10/13 136/205 |
| 2016/0099398 | A1 | 4/2016 | Lorimer et al. | |
| 2018/0031253 | A1 | 2/2018 | McCune et al. | |
| 2018/0135869 | A1 * | 5/2018 | Fard | F24D 12/02 |
| 2019/0360691 | A1 | 11/2019 | Anwar | |
| 2020/0208839 | A1 * | 7/2020 | Ha | F23D 14/02 |
| 2020/0309385 | A1 * | 10/2020 | Kozlov | F24D 17/02 |
| 2020/0309414 | A1 * | 10/2020 | Reardon | F24D 5/02 |
| 2021/0033305 | A1 * | 2/2021 | Kim | F24H 9/2085 |
| 2021/0033306 | A1 * | 2/2021 | Kim | F24H 8/006 |

* cited by examiner

SYSTEM AND METHOD FOR CAPTURING WASTE HEAT IN AN HVAC SYSTEM

CROSS REFERENCE TO A RELATED APPLICATION

The application claims the benefit of India Provisional Application No. 202011010193 filed Mar. 9, 2020, the contents of which are hereby incorporated in their entirety.

BACKGROUND

The subject matter disclosed herein generally relates to heating, ventilation, and air conditioning (HVAC) systems, and more particularly to a system and method for capturing and converting waste heat in a furnace.

A wide range of applications exists for HVAC systems. For example, residential, commercial and industrial systems are used to control temperature and air quality within a comfort space (i.e., a building interior). Some HVAC systems, may include heating apparatuses such as conventional furnaces and boilers. During operation, some furnaces may burn a gas fuel to heat an air supply which is then delivered to a space to be conditioned. In fuel efficient systems, most of the thermal energy generated during combustion is used to heat the supply air; however, some thermal energy is dissipated to the atmosphere from furnace components and the casing. Since this energy is not available for performing work, it is wasted. It would be desirable then, to capture some portion of this otherwise wasted thermal energy and use it to perform useful work to improve overall operating efficiencies.

BRIEF DESCRIPTION

According to one non-limiting embodiment, a gas furnace including: a burner assembly; at least one heat exchanger operably coupled to the burner assembly; a coupling box operably coupled to the at least one first heat exchanger; and a waste heat assembly disposed adjacent to at least one of the coupling box and the burner assembly.

In addition to one or more of the features described above, or as an alternative, in further embodiments, a gas furnace wherein the at least one heat exchanger comprises a primary heat exchanger and secondary heat exchanger.

In addition to one or more of the features described above, or as an alternative, in further embodiments, a gas furnace further comprising a control assembly operably coupled to the burner assembly and the waste heat assembly.

In addition to one or more of the features described above, or as an alternative, in further embodiments, a gas furnace further comprising a blower assembly operably coupled to the control assembly.

In addition to one or more of the features described above, or as an alternative, in further embodiments, a gas furnace further comprising an inducer assembly operably coupled to the control assembly.

In addition to one or more of the features described above, or as an alternative, in further embodiments, a gas furnace wherein the waste heat assembly comprises a thermoelectric generator module including a coated surface.

In addition to one or more of the features described above, or as an alternative, in further embodiments, a gas furnace wherein the coated surface is selected from the group consisting of a dark carbon coating and a solar coating.

In addition to one or more of the features described above, or as an alternative, in further embodiments, a gas furnace wherein the distance between the waste heat assembly and at least one of the coupling box and the burner assembly is approximately greater than or equal to 2.0 millimeters and less than or equal to 5.0 millimeters.

In addition to one or more of the features described above, or as an alternative, in further embodiments, a gas furnace wherein the waste heat assembly is configured to convert a portion of the heat generated by the at least one coupling box and the burner assembly to electrical energy, and provide power to at least one of a sensor, the inducer assembly, the blower assembly, the control assembly, the burner assembly.

According to another non-limiting embodiment, a method of providing power to at least one component within a gas furnace, the method including: operating the gas furnace to produce thermal energy; operating a waste heat assembly to extract the thermal energy from the gas furnace; operating the waste heat assembly to convert the extracted thermal energy to electrical energy; operating the waste heat assembly to transmit the electrical energy to the at least one component of the gas furnace.

In addition to one or more of the features described above, or as an alternative, in further embodiments, a method of providing power to at least one component within a gas furnace wherein operating the gas furnace to produce thermal energy comprises operating a burner assembly to produce a flame to heat at least one heat exchanger and a coupling box operably coupled to the at least one heat exchanger.

In addition to one or more of the features described above, or as an alternative, in further embodiments, a method of providing power to at least one component within a gas furnace wherein operating the waste heat assembly to extract the thermal energy comprises disposing the waste heat assembly adjacent to the at least one of the coupling box and the burner assembly.

In addition to one or more of the features described above, or as an alternative, in further embodiments, a method of providing power to at least one component within a gas furnace wherein the waste heat assembly comprises a thermoelectric generator module including a coated surface.

In addition to one or more of the features described above, or as an alternative, in further embodiments, a method of providing power to at least one component within a gas furnace wherein the coated surface is selected from the group consisting of a dark carbon coating and a solar coating.

In addition to one or more of the features described above, or as an alternative, in further embodiments, a method of providing power to at least one component within a gas furnace wherein operating the waste heat assembly to convert the extracted thermal energy to electrical energy comprises operating the thermoelectric generator to convert heat flux into electricity.

In addition to one or more of the features described above, or as an alternative, in further embodiments, a method of providing power to at least one component within a gas furnace wherein operating the waste heat assembly to transmit the electrical energy to the at least one component of the gas furnace comprises operating the thermoelectric generator to transmit the electricity.

In addition to one or more of the features described above, or as an alternative, in further embodiments, a method of providing power to at least one component within a gas furnace wherein the at least one component comprises a blower assembly, an inducer assembly, and a control device.

In addition to one or more of the features described above, or as an alternative, in further embodiments, a method of providing power to at least one component within a gas furnace wherein the at least one heat exchanger comprises a primary heat exchanger and secondary heat exchanger.

In addition to one or more of the features described above, or as an alternative, in further embodiments, a method of providing power to at least one component within a gas furnace wherein the distance between the waste heat assembly and the at least one of the coupling box and the burner assembly is approximately greater than or equal to 2.0 millimeters and less than or equal to 5.0 millimeters.

BRIEF DESCRIPTION OF THE DRAWINGS

The accompanying drawings form a part of the specification. Throughout the drawings, like reference numbers identify like elements.

DETAILED DESCRIPTION

As will be described in greater detail below the present disclosure provides for capturing unused thermal energy (e.g., waste heat) generated by an operational gas furnace, and converting the thermal energy into electrical energy, such as primary or supplementary power to operate at least one component in the furnace. It should be evident however to one skilled in the art that the present disclosure is not limited to the specific examples given and could be utilized in other systems where waste heat may be generated.

Figure 1:
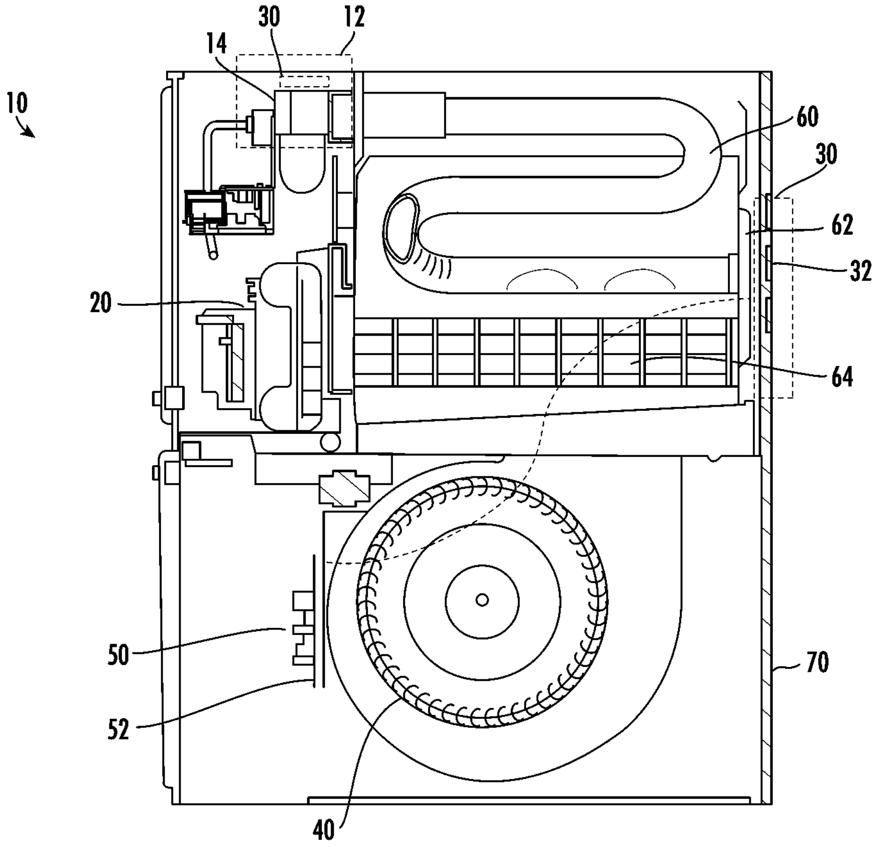
FIG. 1 is a cross-sectional view of a gas furnace in accordance with embodiments of the disclosure.

FIG. 1 is a cross-sectional view of a portion of a conventional condensing gas furnace 10 in accordance with embodiments of the disclosure. The gas furnace 10 illustrated in FIG. 1 is one type of furnace and is not intended to limit the scope of the disclosed embodiments.

Furnace 10 includes a heat exchanger assembly (e.g., 60, 64) operably coupled to a burner assembly 12, an inducer assembly 20, having an inducer fan and inducer motor, and at least one waste heat assembly 30. The gas furnace 10 may further include a blower assembly 40, having a blower and blower motor, disposed adjacent to the heat exchanger assembly 60, 64. The gas furnace 10 may further include a control assembly 50 having a control device 52, the control assembly 50 operably coupled to at least one of the burner assembly 12, the inducer assembly 20, at least one waste heat assembly 30, the blower assembly 40, and the control device 52.

The burner assembly 12, includes a burner box 14 and a gas valve assembly (not shown). The burner assembly 12 is configured to ignite a fuel/air mixture in the burner assembly 12. The burner assembly receives fuel through the gas valve assembly, and air for combustion from outside atmosphere via vent. The fuel/air mixture may be ignited by an igniter assembly (not shown) which may be disposed within the burner assembly 12. The burner 12 assembly includes a plurality of sensors, in electrical communication with the control assembly 50, for measuring the temperature of the burner box 14, and for generating and sensing a flame within the burner assembly 12.

The heat exchanger assembly 60, 64 includes at least one heat exchanger. In an embodiment, the at least one heat exchanger includes a primary or non-condensing heat exchanger 60 and a secondary or condensing heat exchanger 64. The heat exchanger assembly 60, 64 is configured to transfer heat from the combustion of the fuel/air mixture in the burner assembly 12, to an indoor space to be heated. During operation, the blower assembly 40 is configured to direct air over the at least one heat exchanger. The circulating airflow may be thereafter directed to a space to be heated through a duct system (not shown). During operation, flue gases are directed from at least one heat exchanger through an operably coupled coupling box 62. By way of example, in a gas furnace 10 having a primary heat exchanger 60 and a secondary heat exchanger 64, the coupling box 62 may be a conduit through which flue gases may be transferred from the primary heat exchanger 60 to the secondary heat exchanger 64.

The gas furnace 10 may include at least one waste heat assembly 30. The waste heat assembly 30 includes at least one thermoelectric generator (TEG) module 32. The at least one waste heat assembly 30 is configured to convert a temperature difference and a heat flux into an electrical power source. In an embodiment, the at least one waste heat assembly 30 is disposed adjacent to the coupling box 62. It will be appreciated that the waste heat assembly 30 may be in contact with the coupling box 62 or separated by a distance, discussed below.

The control assembly 50, which includes a control device 52 (e.g., control board), may be configured to utilize the electrical power generated by the waste heat assembly 30. In one non-limiting embodiment, the extracted thermal energy from at least one waste heat assembly 30 may be used as primary or supplementary power to operate any or all of the burner assembly 12, the inducer assembly 20, the blower assembly 40, the control device 52, and sensors. In some embodiments, the control assembly 50 may be configured to store power (e.g., in a battery) for use when the gas furnace 10 is off, and then use the stored power to operate any or all of the burner assembly 12, inducer assembly 20, blower assembly 40, control device 52, and sensors. For example, the control assembly 50, may be configured to use stored power as primary power to operate the control device 52 when the furnace is off. By utilizing extracted thermal energy to power these components the gas furnace 10, may require less external power (e.g., AC power) thereby increasing overall operating electrical efficiencies of the furnace.

Figure 2:
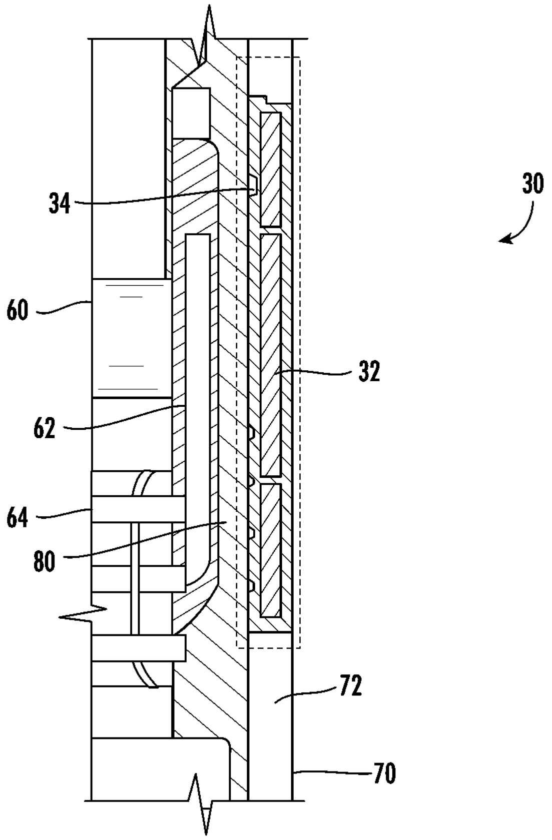
FIG. 2 is a cross-sectional view of a portion of a gas furnace in accordance with embodiments of the disclosure.

Turning to FIG. 2, a cross-sectional view of a portion of a gas furnace 10, including the waste heat assembly 30, in accordance with embodiments of the disclosure is shown. In some embodiments, the waste heat assembly 30, may be disposed adjacent to the burner assembly such that heat radiates directly from the burner assembly 14. In another non-limiting embodiment, the waste heat assembly 30 may be disposed adjacent to the coupling box 62, and may be in contact with the coupling box 62 or may be separated by a distance. For example, during operation, heat from the coupling box 62 radiates across a thermal air gap 80 to the waste heat assembly 30. In one non-limiting embodiment, the waste heat assembly 30 and the coupling box 62 may be separated by a distance equal to or greater than 2.0 millimeters and less than or equal to 5.0 millimeters.

In some embodiments, the waste heat assembly 30 may have a thermal coating 34 for absorbing heat. In an embodiment, the waste heat assembly 30 may have at least one of a solar coating and a dark carbon coating for absorbing radiant heat from coupling box 62. To illustrate, the surface of waste heat assembly 30 adjacent to thermal air gap 80 may have a dark carbon coating and/or a solar coating, while the opposing surface may have no coating. For example, a solar coating may include one or more nano-crystalline layers deposited by a chemical process.

In one non-limiting embodiment, the waste heat assembly 30 may be disposed in whole or in part, within the insulation 70 of gas furnace 10. In another non-limiting embodiment, at least a portion of the waste heat assembly 30 may be exposed to ambient air. For example, a portion of the waste heat assembly 30 may be contiguous with the casing 72. In addition, a portion of at least one TEG module 32 may be exposed to ambient air.

Figure 3:
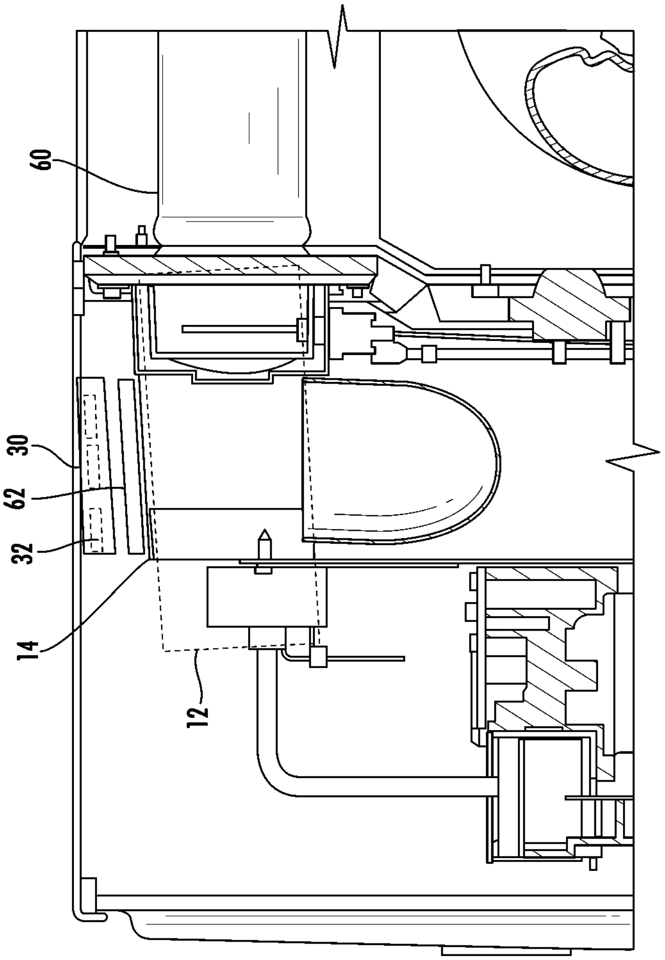
FIG. 3 is a cross-sectional view of a portion of a gas furnace in accordance with embodiments of the disclosure.

Turning to FIG. 3, a cross-sectional view of a portion of a gas furnace 10 in accordance with embodiments of the disclosure is shown. In some embodiments, the waste heat assembly 30 may be disposed adjacent to a burner assembly 12 and may be in contact with the burner assembly 12, or separated by a distance. In one non-limiting embodiment, the distance between the waste heat assembly 30 and the burner assembly 12 may be equal to or greater than 2.0 millimeters and less than or equal to 5.0 millimeters. In another example, the waste heat assembly 30 may be disposed adjacent to the burner box 14. In another non-limiting embodiment the waste heat assembly 30 may be separated from the burner assembly 12 by a distance that may be equal to or greater than 2.0 millimeters and less than or equal to 5.0 millimeters.

Figure 4:
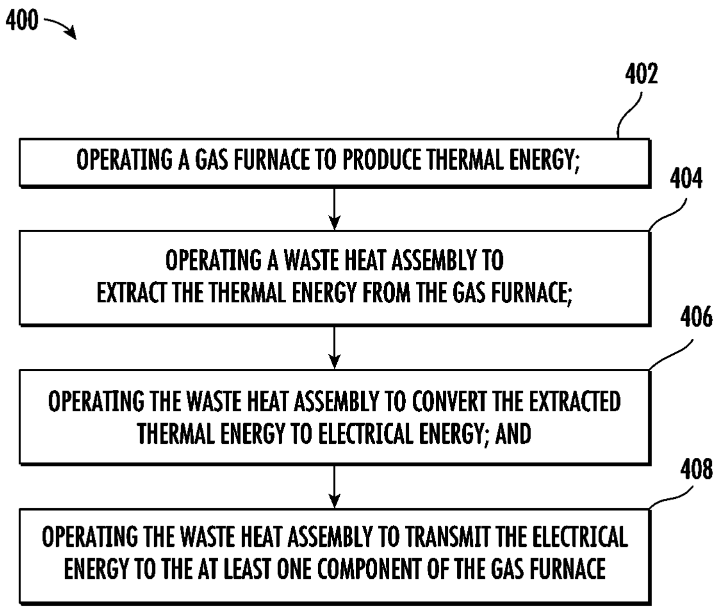
FIG. 4 illustrates a method of providing power to at least one component within a gas furnace in accordance with embodiments of the disclosure.

Turning to FIG. 4, a method for providing power to at least one component of a gas furnace 10 in accordance with embodiments of the disclosure is shown. The method includes: operating the gas furnace 10 to produce thermal energy; operating a waste heat assembly 30 to extract the thermal energy from the gas furnace 10; operating the waste heat assembly 30 to convert the extracted thermal energy to electrical energy; and operating the waste heat assembly 30 to transmit the electrical energy to at least one component of the gas furnace 10.

Starting at step 402, a thermal energy is produced when a gas furnace 10 is operational. As hot air flows from at least one of a primary heat exchanger 60 and a secondary heat exchanger 64 through the coupling box 62, the coupling box 62 is also heated. For example, coupling box 62 temperatures may reach or exceed 400° C.

In step 404, the waste heat assembly 30 extracts thermal energy from the heat generated by the gas furnace 10 in step 402. The waste heat assembly 30 extracts thermal energy from the gas furnace 10 due to the Seebeck effect which utilizes heat flux and a temperature differential between the coupling box 62 and the ambient air side of the waste heat assembly 30 to produce a voltage potential.

In step 406, the waste heat assembly 30 is operated to convert the extracted thermal energy from a voltage potential (e.g., a DC signal) to AC power, using for example, a power inverter.

In step 408, the converted energy is electrically transmitted to the control assembly 50. The control assembly 50 may be configured to use the AC power from step 406 during operation of the gas furnace 10. In one non-limiting embodiment, the power may be transmitted and used as primary or supplementary power to operate at least one of a burner assembly 12, an inducer assembly 20, a blower assembly 40, a control device 52, and sensors. In some embodiments, the control assembly 50 may be configured to store at least a portion of the AC power from step 406, for use by the gas furnace 10 when it is off. For example, when the gas furnace 10 is off, the control assembly 50 may be configured to transmit power to operate at least one of a burner assembly 12, an inducer assembly 20, and a blower assembly 40, a control device 52, and sensors.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

We claim:

1. A heating apparatus for a heating, ventilation, and air conditioning (HVAC) system, the heating apparatus comprising:

a gas furnace comprising:

a burner assembly;

at least one heat exchanger operably coupled to the burner assembly;

a coupling box operably coupled to the at least one heat exchanger; and a waste heat assembly disposed adjacent to the coupling box, wherein heat from the coupling box radiates across a thermal air gap to the waste heat assembly, and the waste heat assembly is configured to convert a portion of heat generated by the coupling box to electrical energy.

2. The gas furnace of claim 1, wherein the at least one heat exchanger comprises a primary heat exchanger and a secondary heat exchanger.

3. The gas furnace of claim 1, further comprising a control assembly operably coupled to the burner assembly and the waste heat assembly.

4. The gas furnace of claim 3, further comprising a blower assembly operably coupled to the control assembly.

5. The gas furnace of claim 4, further comprising an inducer assembly operably coupled to the control assembly.

6. The gas furnace of claim 5, wherein the waste heat assembly is configured to provide power to at least one of a sensor, the inducer assembly, the blower assembly, the control assembly, and the burner assembly.

7. The gas furnace of claim 1, wherein the waste heat assembly comprises a thermoelectric generator module including a coated surface.

8. The gas furnace of claim 7, wherein the coated surface is selected from the group consisting of a dark carbon coating and a solar coating.

9. The gas furnace of claim 1, wherein the distance between the waste heat assembly and the coupling box is approximately greater than or equal to 2.0 millimeters and less than or equal to 5.0 millimeters.

10. A method of providing power to at least one component of a heating apparatus for a heating, ventilation, and air conditioning (HVAC) system, the heating apparatus comprising a gas furnace, the method comprising:

operating the gas furnace;

operating a waste heat assembly disposed adjacent to a coupling box of the gas furnace to convert a portion of heat generated by the coupling box to electrical energy; and operating the waste heat assembly to transmit the electrical energy to the at least one component of the heating apparatus for the HVAC system, wherein heat from the coupling box radiates across a thermal air gap to the waste heat assembly.

11. The method of claim 10, wherein operating the gas furnace comprises operating a burner assembly to produce a flame to heat at least one heat exchanger and the coupling box operably, the coupling box being coupled to the at least one heat exchanger.

12. The method of claim 11, wherein the at least one heat exchanger comprises a primary heat exchanger and a secondary heat exchanger.

13. The method of claim 12, wherein the waste heat assembly comprises a thermoelectric generator module including a coated surface.

14. The method of claim 13, wherein the coated surface is selected from the group consisting of a dark carbon coating and a solar coating.

15. The method of claim 12, wherein a distance between the waste heat assembly and the at least one of the coupling box and the burner assembly is approximately greater than or equal to 2.0 millimeters and less than or equal to 5.0 millimeters.

16. The method of claim 10, wherein operating the waste heat assembly to convert the heat to electrical energy comprises operating the thermoelectric generator to convert heat flux into electricity.

17. The method of claim 10, wherein operating the waste heat assembly to transmit the electrical energy comprises operating the thermoelectric generator to transmit the electricity.

18. The method of claim 10, wherein the at least one component comprises a blower assembly, an inducer assembly, and a control device.

* * * * *